US012218916B2

(12) United States Patent
Kharrl et al.

(10) Patent No.: US 12,218,916 B2
(45) Date of Patent: Feb. 4, 2025

(54) SYSTEMS, METHODS AND MEDIA FOR THE CREATION OF A PROTECTIVE LAYER BETWEEN AN APPLICATION AND A CYBERSECURITY RISK

(71) Applicant: SpecTrust, Inc., San Jose, CA (US)

(72) Inventors: Nate Kharrl, San Jose, CA (US); Colben Matthew Kharrl, Goodyear, AZ (US)

(73) Assignee: SpecTrust, Inc., San Jose, CA (US)

( * ) Notice: Subject to any disclaimer, the term of this patent is extended or adjusted under 35 U.S.C. 154(b) by 362 days.

(21) Appl. No.: 17/564,014

(22) Filed: Dec. 28, 2021

(65) Prior Publication Data

US 2023/0208814 A1 Jun. 29, 2023

(51) Int. Cl.
*H04L 9/40* (2022.01)
(52) U.S. Cl.
CPC ...... *H04L 63/0281* (2013.01); *H04L 63/1433* (2013.01)
(58) Field of Classification Search
None
See application file for complete search history.

(56) References Cited

U.S. PATENT DOCUMENTS

| | | | | |
|---|---|---|---|---|
| 2015/0180857 A1* | 6/2015 | Schulman | ............... | H04L 63/08 726/9 |
| 2019/0342305 A1* | 11/2019 | Sunkaranam | ......... | H04L 63/145 |
| 2020/0202039 A1* | 6/2020 | Madisetti | ............ | G06F 21/6218 |
| 2020/0314101 A1* | 10/2020 | Zhang | ................ | H04L 63/1433 |
| 2021/0194824 A1* | 6/2021 | Wu | ......................... | H04L 47/82 |
| 2022/0074690 A1* | 3/2022 | Lloyd | ..................... | H04W 4/38 |
| 2022/0078224 A1* | 3/2022 | Saxena | .............. | H04L 41/0293 |
| 2022/0150281 A1* | 5/2022 | Kanungo | .............. | G06F 16/906 |
| 2022/0171861 A1* | 6/2022 | Li | ............................ | G06F 8/65 |

* cited by examiner

*Primary Examiner* — Bassam A Noaman
(74) *Attorney, Agent, or Firm* — Carr & Ferrell LLP

(57) ABSTRACT

Exemplary embodiments include an intelligent secure networked system configured by at least one processor to execute instructions stored in memory to form a protective layer between an application and a cybersecurity risk, the system including a HTTPS load balancer in communication with a controller/proxy, the controller/proxy in communication with a session database, a secrets management server and a workflow engine, the workflow engine in communication with the session database, the secrets management server and an integration station, and a hub server in communication with the session database, the secrets management server, and a hub client. The HTTPS load balancer may be configured to perform load balancing and autoscaling of communications to the controller/proxy. The controller/proxy may be configured to write session data to the session database, and the controller/proxy may be configured to read secrets to the secrets management server.

48 Claims, 5 Drawing Sheets

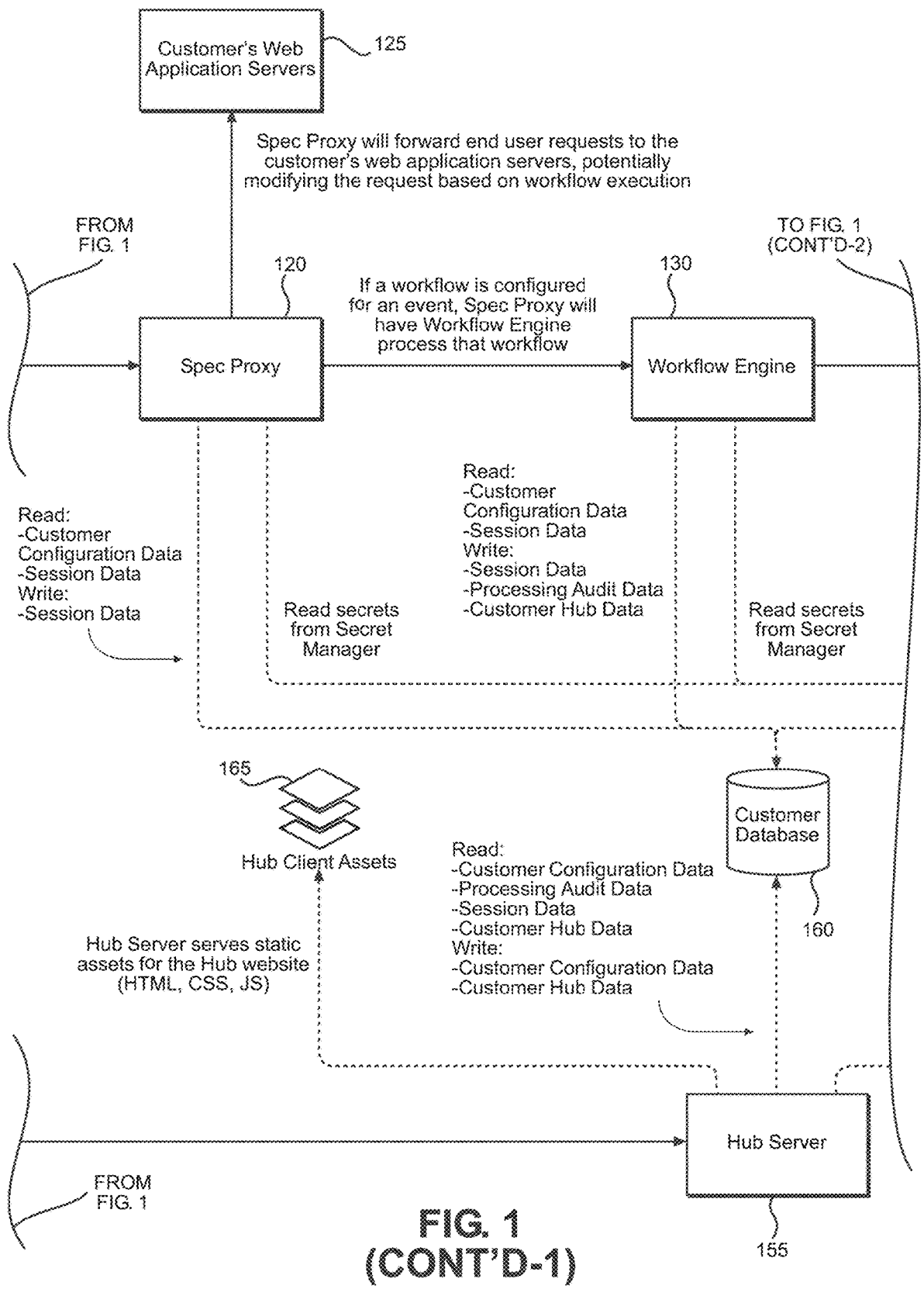
FIG. 1 (CONT'D-1)

(CONT'D-2)

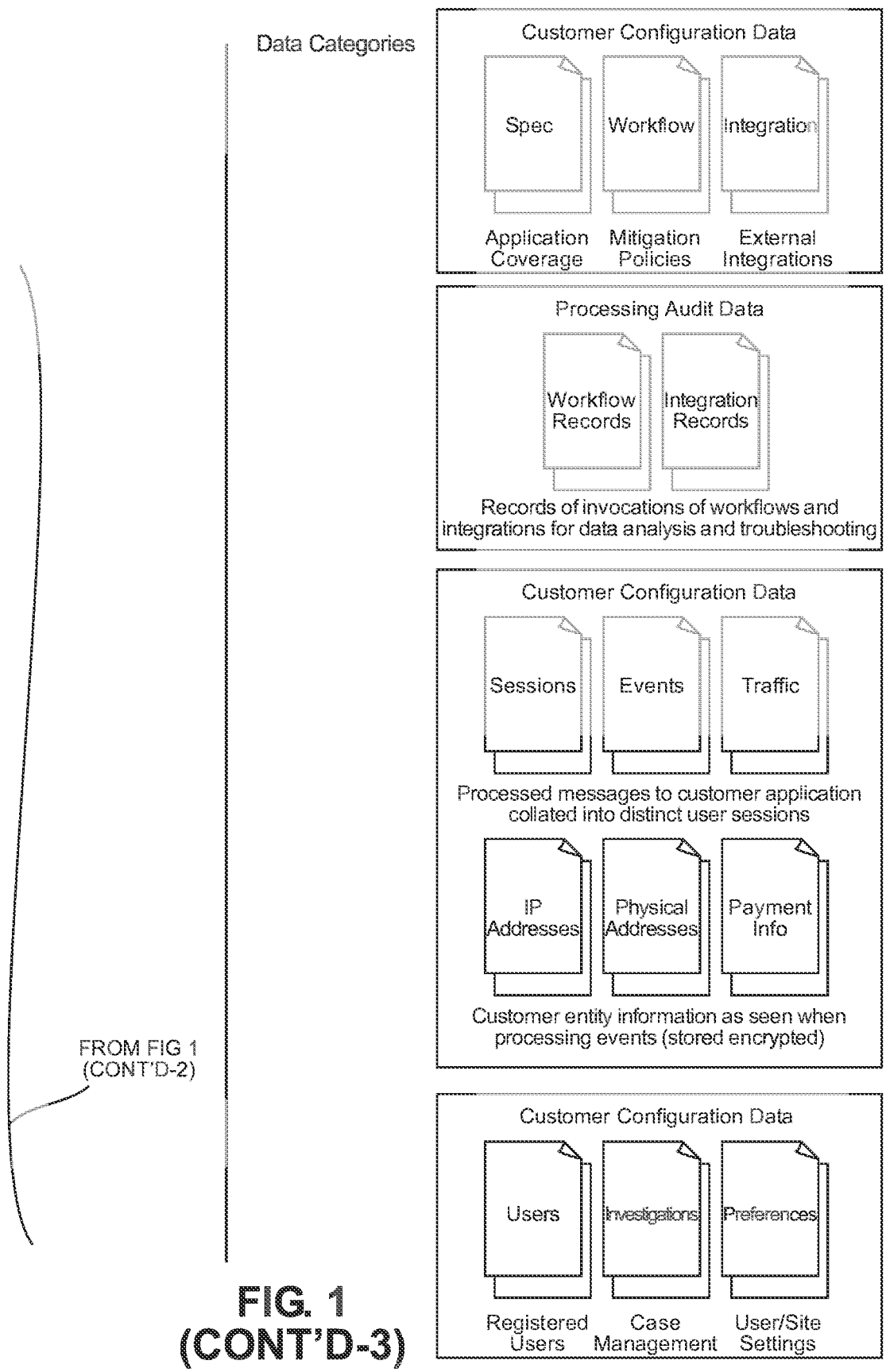
FIG. 1 (CONT'D-3)

SYSTEMS, METHODS AND MEDIA FOR THE CREATION OF A PROTECTIVE LAYER BETWEEN AN APPLICATION AND A CYBERSECURITY RISK

FIELD OF INVENTION

The present technology pertains to systems, methods and media for network security.

SUMMARY OF EXEMPLAY EMBODIMENTS

Exemplary embodiments include an intelligent secure networked system configured by at least one processor to execute instructions stored in memory to form a protective layer between an application and a cybersecurity risk, the system including a HTTPS load balancer in communication with a controller/proxy, the controller/proxy in communication with a session database, a secrets management server and a workflow engine, the workflow engine in communication with the session database, the secrets management server and an integration station, and a hub server in communication with the session database, the secrets management server, and a hub client. The HTTPS load balancer may be configured to perform load balancing and autoscaling of communications to the controller/proxy. The controller/proxy may be configured to write session data to the session database, and the controller/proxy may be configured to read secrets to the secrets management server.

Additionally, the controller/proxy may be configured to forward a request to a customer origin server. The workflow engine may be configured to read secrets from the secrets management server, and the workflow engine may be configured to read/write session data, workflow data, and integration data to the session database. The workflow engine can be configured to cause the integration station to trigger a third-party call, and the integration station can be configured to trigger vendor integration with an external risk vendor. Further, the integration station can be configured to trigger customer integration with a customer endpoint server.

In various exemplary embodiments, the hub server may be configured to read session data and read and write customer configuration data and investigation data to the session database. The hub server may be configured to read and write a secret to the secrets management server and the hub server may be configured to serve the hub client as a static asset to a customer computing device. Additionally, the session database may be configured to store collated session information. The secrets management server may be configured to store a secret and other sensitive information. The hub client may be configured as a static front-end asset.

The intelligent secure networked system, according to exemplary embodiments, may perform passive traffic monitoring in parallel and process risk information in under 20 milliseconds. Additionally, the intelligent secure networked system may be SOC 2 security audit compliant.

In various exemplary embodiments, a networked user computing device may be in communication with the HTTPS load balancer, and a customer origin server may be in communication with the controller/proxy. An external risk vendor server may be in communication with the integration station. The architecture may also include a customer endpoint server and an external risk vendor server.

Additionally, the collated session information, in many exemplary embodiments, may include concurrent, unordered and unsigned requests that are positively attributed to a device of a specific end-user. Device and network attributes may be used in the concurrent, unordered and unsigned requests to generate a technical fingerprint. A technical fingerprint with a fuzzy matching algorithm may be used to compare a request to another received request to attribute it to the device of the specific end-user. The customer configuration data may provide configuration instructions to any of a spec proxy, the workflow engine or the integration station. The customer configuration data may be deployed in the hub server.

Exemplary methods include using an intelligent secure networked system configured by at least one processor to execute instructions stored in memory to form a protective layer between an application and a cybersecurity risk, the method including a HTTPS load balancer communicating with a controller/proxy, the controller/proxy communicating with a session database, a secrets management server and a workflow engine, the workflow engine communicating with the session database, the secrets management server and an integration station, and a hub server communicating with the session database, the secrets management server, and a hub client. The HTTPS load balancer may perform load balancing and autoscaling of communications to the controller/proxy. The controller/proxy may write session data to the session database and the controller/proxy may read secrets to the secrets management server. Further, the controller/proxy may forward a request to a customer origin server.

The workflow engine, according to exemplary embodiments, may read secrets from the secrets management server and the workflow engine may read and write session data, workflow data, and integration data to the session database. The workflow engine may cause the integration station to trigger a third-party call. The integration station may trigger vendor integration with an external risk vendor. The integration station may also trigger customer integration with a customer endpoint server.

According to various exemplary embodiments, the hub server may read session data and read and write customer configuration data and investigation data to the session database. The hub server may read and write a secret to the secrets management server. The hub server may serve the hub client as a static asset to a customer computing device. The session database may also store collated session information. The secrets management server may store a secret and other sensitive information. The hub client may serve as a static front-end asset.

Exemplary methods also include performing passive traffic monitoring in parallel and processing risk information in under 20 milliseconds. The intelligent secure networked system may be SOC 2 security audit compliant, and a networked user computing device may communicate with the HTTPS load balancer. Additionally, a customer origin server may communicate with the controller/proxy and an external risk vendor server may communicate with the integration station. Additional methods may include a customer endpoint server and an external risk vendor server.

Collated session information, according to exemplary methods, may include concurrent, unordered and unsigned requests that are positively attributed to a device of a specific end-user. Device and network attributes may be used in the concurrent, unordered and unsigned requests to generate a technical fingerprint. The technical fingerprint may be used with a fuzzy matching algorithm to compare a request to another received request to attribute it to the device of the specific end-user. The customer configuration data may provide configuration instructions to any of a spec proxy, the workflow engine or the integration station. Additionally, the customer configuration data may be deployed in the hub server.

BRIEF DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

The detailed embodiments of the present technology are disclosed here. It should be understood, that the disclosed embodiments are merely exemplary of the technology, which may be embodied in multiple forms. Those details disclosed herein are not to be interpreted in any form as limiting, but as the basis for the claims.

In the description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Figure 1:
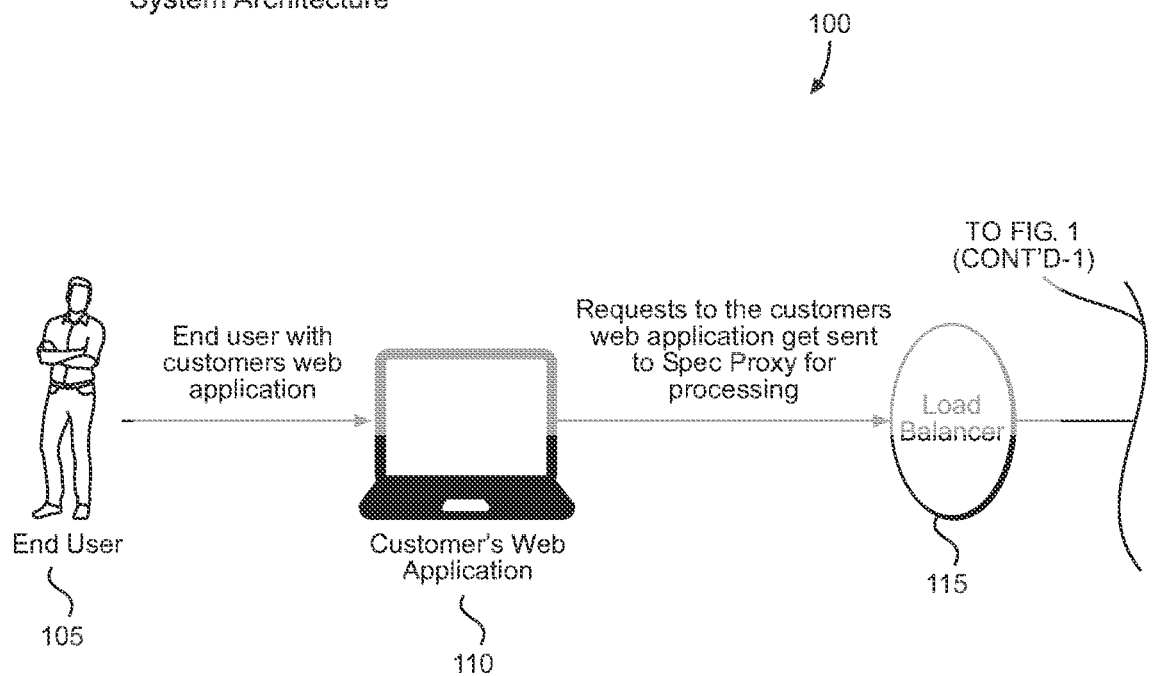
FIG. 1 is an exemplary architecture for an intelligent secure networked system to form a protective layer between an application and a cybersecurity risk.
Figure 1:
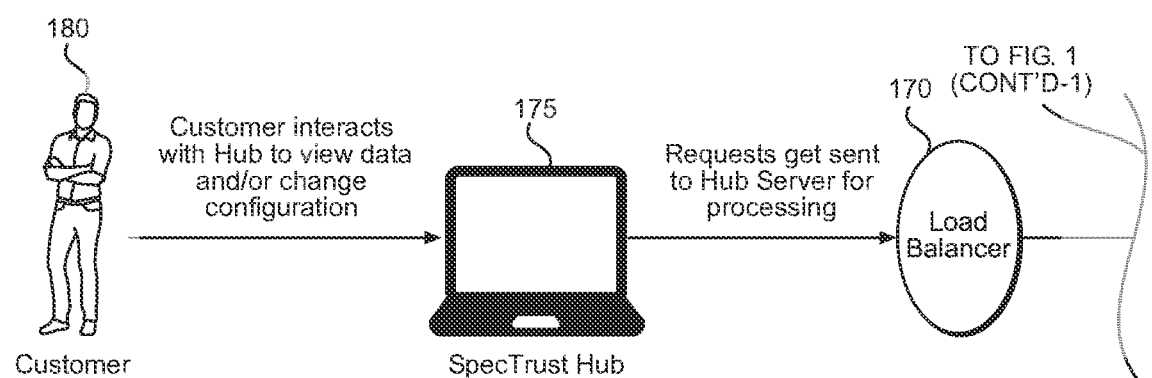
Figure 1:
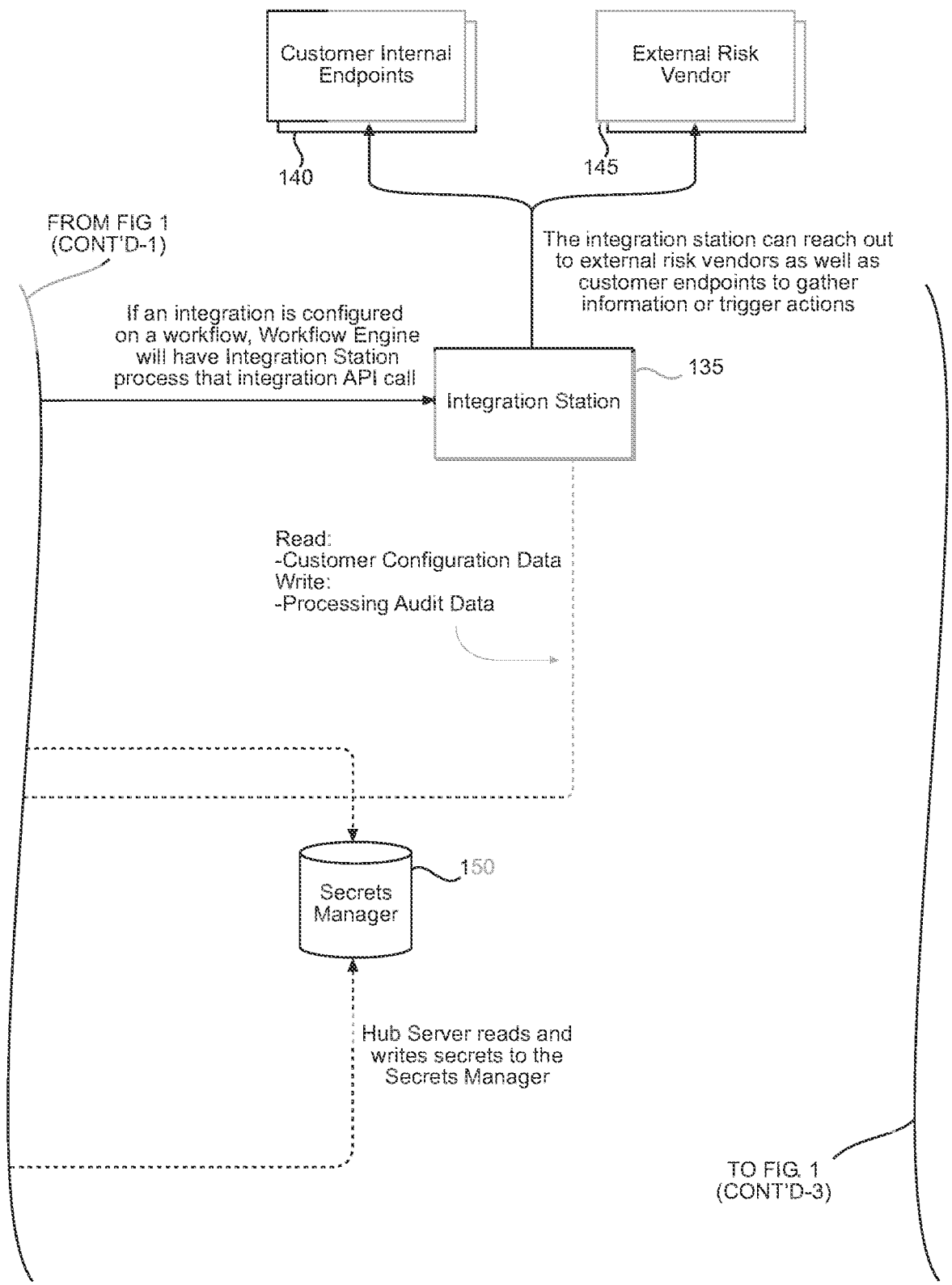

FIG. 1 describes a system that extracts, processes, and stores data pursuant to detecting cybercrime access patterns from real-time traffic flowing to and from a commercial software application. Processing instructions for external data enrichment and automated workflow execution can be streamed to this platform in real time to dynamically adjust its operation. All data processed by the platform is stored as an operation record that provides context for future processing.

According to exemplary embodiments, an end-user interacts with an online application using their mobile device or web browser. That request is routed to the platform via a domain route setting. An application load balancer selects an available spec proxy to handle the request. The selected spec proxy determines if the request needs to be processed, and if so, if the request should be held until processing is complete. These instructions are stored in the secrets management system. If the request is to be processed, the spec proxy detects relevant user data contained in the request and creates a copy of that data, normalizes it for the platform's data structure, and determines what user session to associate this data with. If this request should trigger workflows (as configured in the secrets management system), the workflow engine transforms data into workable facts, evaluates facts against conditional criteria, and queries external systems through the integration station. The result of the workflow engine's execution could be to trigger actions that would alter the original request, send requests to downstream systems and/or update risk assessments in the associated user session record.

The original request is serviced by spec proxy, either by forwarding it to the intended application origin or responding directly to the end user. Stakeholders for the online application can review a full record of the session on the hub, which can access and analyze the data created by the spec proxies, workflow engines, and integration stations. The hub can also change configurations stored in the secrets management system.

In greater detail, FIG. 1 is an exemplary architecture 100 for an intelligent secure networked system to form a protective layer between an application and a cybersecurity risk.

Shown in FIG. 1 are end user 105, customer's web application 110, load balancer 115, spec proxy 120, customer's web application servers 125, workflow engine 130, integration station 135, customer internal endpoints 140, external risk vendor 145, secrets manager 150, hub server 155, customer database 160, hub client assets 165, load balancer 170, spec trust hub 175, and customer 180.

According to exemplary embodiments, the end user 105 interacts with customer's web application 110. Requests to the customers web application are sent to spec proxy 120 for processing. These requests are sent via load balancer 115. Spec proxy 120 forwards end user requests to the customer's web application servers 125, potentially modifying the request based on the workflow execution. If a workflow is configured for an event, spec proxy 120 will have the workflow engine 130 process that workflow. Spec proxy 120 is configured to read customer configuration data, session data, and to write session data. Spec proxy 120 is also configured to read secrets from the secrets manager 150. The workflow engine 130 is configured to read customer configuration data, and session data. The workflow engine 130 is also configured to write session data, processing audit data, and customer hub data. The workflow engine 130 is also configured to read secrets from the secrets manager 150. If an integration is configured on a workflow, workflow engine 130 will have integration station 135 process that integration API call. Integration station 135 can reach out to external risk vendor 145 and customer internal endpoints 140 to gather information or trigger actions. The integration station 135 is configured to read customer configuration data and to write processing audit data. The hub server 155 reads and writes secrets to the secrets manager 150.

The customer database 160 is configured to receive from the hub server 155 customer configuration data, process audit data, session data, and customer hub data. The customer database 160 is also configured to receive customer configuration data and customer hub data. The hub server 155 serves static assets for the hub website as received at hub client assets 165.

As shown in FIG. 1, customer 180 interacts with the spec trust hub 175 to view data and or change configurations on spec trust hub 175. Requests from spec trust hub 175 are sent to the hub server 155 for processing by way of load balancer 170.

Also shown in FIG. 1 are data categories including customer configuration data, processing audit data, customer configuration data, and customer configuration data. The customer configuration data includes spec, workflow, and integration data. The spec data includes application coverage, the workflow data includes mitigation policies, and the integration data includes external integrations. The processing audit data includes workflow records and integration records. The processing audit data includes records of invocations of workflows and integrations for data analysis and troubleshooting. Customer configuration data includes sessions, events, and traffic. The customer configuration data includes processed messages to customer applications collated into distinct user sessions. The customer configuration data also includes IP addresses, physical addresses, and payment information. The customer configuration data includes customer entity information as seen when processing events and is stored encrypted. The customer configuration data includes users, investigations and preferences. This also includes registered users, case management, and user/site settings.

Figure 2:
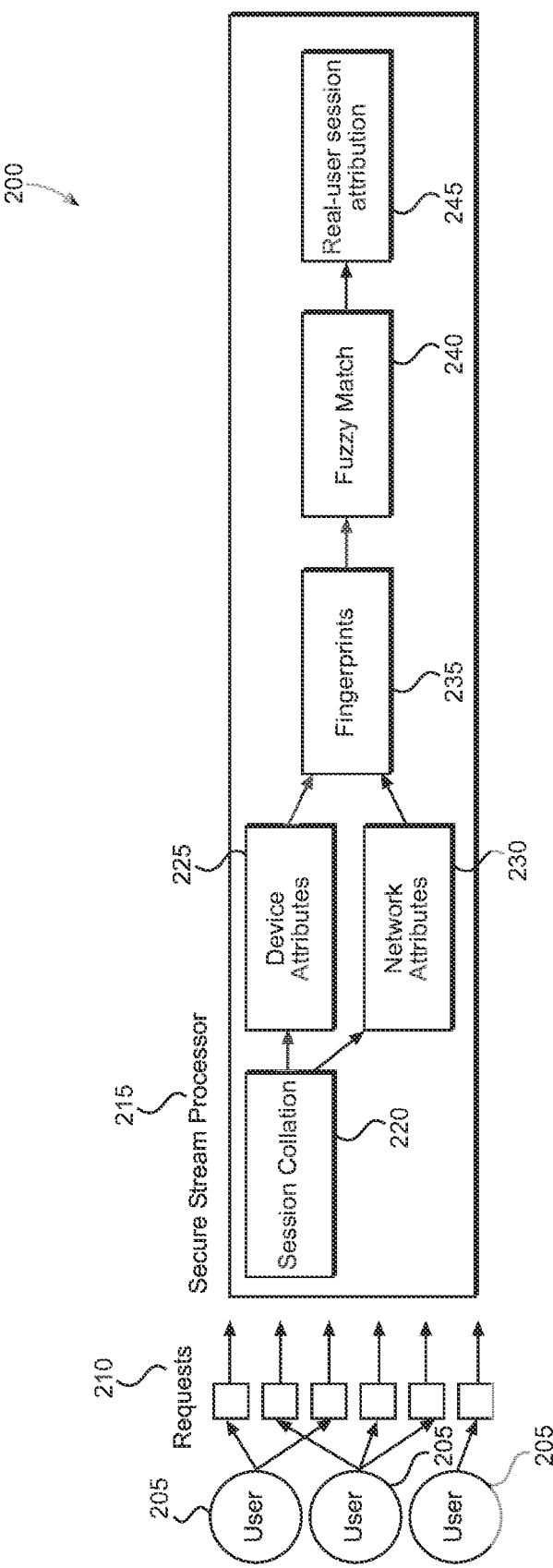
FIG. 2 illustrates an exemplary session collation schematic.

FIG. 2 illustrates an exemplary session collation schematic 200.

FIG. 2 describes a system that determines common request owners in a large stream of mixed network requests, some of which may be users that are intentionally trying to disguise their identity, by using probabilistic matching of common message characteristics.

Schematic 200 shows a plurality of users 205, a plurality of requests 210, secure stream processor 215, session collation 220, device attributes 225, network attributes 230, fingerprints 235, fuzzy match 240, and real user session attribution 245.

As shown in FIG. 2, multiple users 205 are associated with multiple requests 210 going into a secure stream processor 215. Within the secure stream processor 215, session collation 220 is communicated to device attributes 225 and network attributes 230, both of which are communicated to fingerprints 235, which are communicated to fuzzy matching 240, which are communicated to real-user session attribution 245.

According to exemplary embodiments, spec proxies process multiple requests without explicit knowledge to which end user each request comes from. Each spec proxy generates unique cryptographic fingerprints for each request using network data and system data contained within each request. A fingerprint-matching algorithm ensures that each request is associated with prior requests based on common fingerprints.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. An intelligent secure networked system configured by at least one processor to execute instructions stored in memory to form a protective layer between an application and a cybersecurity risk, the system comprising:

an HTTPS load balancer in communication with a controller/proxy, the controller/proxy configured to detect relevant user data contained in a first request, to create a copy of the relevant user data, and to determine what session the relevant user data is to be associated;

the controller/proxy in communication with a session database, a secrets management server and a workflow engine, the workflow engine in communication with the session database, the secrets management server and an integration station;

the session database configured, by the at least one processor and the memory, to collate and store session information, the session information including requests that are received concurrently, unordered, or in unsigned form and subsequently collated by the system and attributed to a device of a specific end-user, the attribution to the device of the specific end-user being effected by:

generating, by the at least one processor, a technical fingerprint using probabilistic matching of common message characteristics and device and network attributes in the concurrent, unordered, and unsigned requests; and using, by the at least one processor, the technical fingerprint with a fuzzy matching algorithm to compare a first received request to a second received request; and a hub server in communication with the session database, the secrets management server, and a hub client.

2. The intelligent secure networked system of claim 1, further comprising the HTTPS load balancer programmed to perform load balancing and autoscaling of communications to the controller/proxy.

3. The intelligent secure networked system of claim 2, further comprising the controller/proxy configured to write session data to the session database.

4. The intelligent secure networked system of claim 3, further comprising the controller/proxy configured to read secrets to the secrets management server.

5. The intelligent secure networked system of claim 4, further comprising the controller/proxy configured to forward a request to a customer origin server.

6. The intelligent secure networked system of claim 5, further comprising the workflow engine configured to read secrets from the secrets management server.

7. The intelligent secure networked system of claim 6, further comprising the workflow engine configured to read and write session data, workflow data, and integration data to the session database.

8. The intelligent secure networked system of claim 7, further comprising the workflow engine configured to cause the integration station to trigger a third-party call.

9. The intelligent secure networked system of claim 8, further comprising the integration station comprising at least one further processor executing further instructions stored in the memory and configured to trigger vendor integration with an external risk vendor.

10. The intelligent secure networked system of claim 9, further comprising the integration station configured to trigger customer integration with a customer endpoint server.

11. The intelligent secure networked system of claim 10, further comprising the hub server configured to read session data and read and write customer configuration data and investigation data to the session database.

12. The intelligent secure networked system of claim 11, further comprising the hub server configured to read and write a secret to the secrets management server.

13. The intelligent secure networked system of claim 12, further comprising the hub server configured to serve the hub client as a static asset to a customer computing device.

14. The intelligent secure networked system of claim 13, further comprising the secrets management server configured to store the secret and other sensitive information.

15. The intelligent secure networked system of claim 14, further comprising the hub client configured as a static front-end asset.

16. The intelligent secure networked system of claim 15, further comprising performing passive traffic monitoring in parallel.

17. The intelligent secure networked system of claim 16, further comprising processing risk information in under 20 milliseconds.

18. The intelligent secure networked system of claim 17, wherein the intelligent secure networked system is System and Organization Controls 2 (SOC 2) security audit compliant.

19. The intelligent secure networked system of claim 1, further comprising a networked user computing device in communication with the HTTPS load balancer.

20. The intelligent secure networked system of claim 1, further comprising a customer origin server in communication with the controller/proxy.

21. The intelligent secure networked system of claim 1, further comprising an external risk vendor server in communication with the integration station.

22. The intelligent secure networked system of claim 21, further comprising a customer endpoint server and the external risk vendor server.

23. The intelligent secure networked system of claim 11, wherein the customer configuration data provides configuration instructions to any of a spec proxy, the workflow engine or the integration station.

24. The intelligent secure networked system of claim 23, wherein the customer configuration data is deployed in the hub server.

25. A method of using an intelligent secure networked system configured by at least one processor to execute instructions stored in memory to form a protective layer between an application and a cybersecurity risk, the method comprising:
    communicating by an HTTPS load balancer with a controller/proxy, the controller/proxy configured to detect relevant user data contained in a first request, to create a copy of the relevant user data, and to determine what session the relevant user data is to be associated;
    communicating by the controller/proxy with a session database, a secrets management server and a workflow engine, the workflow engine communicating with the session database, the secrets management server and an integration station
    collating and storing by the session database, by the at least one processor and the memory, session information, the session information including requests that are received concurrently, unordered, or in unsigned form and subsequently collated by the system and attributed to a device of a specific end-user, the attribution to the device of the specific end-user being effected by:
        generating, by the at least one processor, a technical fingerprint using probabilistic matching of common message characteristics and device and network attributes in the concurrent, unordered, and unsigned requests; and
        using, by the at least one processor, the technical fingerprint with a fuzzy matching algorithm to compare a first received request to a second received request; and
    communicating by a hub server with the session database, the secrets management server, and a hub client.

26. The method of claim 25, further comprising performing by the HTTPS load balancer load balancing and autoscaling of communications to the controller/proxy.

27. The method of claim 26, further comprising writing by the controller/proxy session data to the session database.

28. The method of claim 27, further comprising reading by the controller/proxy secrets to the secrets management server.

29. The method of claim 28, further comprising forwarding by the controller/proxy a request to a customer origin server.

30. The method of claim 29, further comprising reading by the workflow engine secrets from the secrets management server.

31. The method of claim 30, further comprising reading and writing by the workflow engine session data, workflow data, and integration data to the session database.

32. The method of claim 31, further comprising causing by the workflow engine the integration station to trigger a third-party call.

33. The method of claim 32, further comprising triggering by the integration station vendor integration with an external risk vendor.

34. The method of claim 33, further comprising triggering by the integration station customer integration with a customer endpoint server.

35. The method of claim 34, further comprising reading by the hub server session data and reading and writing customer configuration data and investigation data to the session database.

36. The method of claim 35, further comprising reading and writing by the hub server a secret to the secrets management server.

37. The method of claim 36, further comprising serving by the hub server the hub client as a static asset to a customer computing device.

38. The method of claim 37, further comprising storing by the secrets management server the secret and other sensitive information.

39. The method of claim 38, further comprising serving by the hub client as a static front-end asset.

40. The method of claim 39, further comprising performing passive traffic monitoring in parallel.

41. The method of claim 40, further comprising processing risk information in under 20 milliseconds.

42. The method of claim 41, further comprising ensuring the intelligent secure networked system is System and Organization Controls 2 (SOC 2) security audit compliant.

43. The method of claim 25, further comprising communicating by a networked user computing device with the HTTPS load balancer.

44. The method of claim 25, further comprising communicating by a customer origin server with the controller/proxy.

45. The method of claim 25, further comprising communicating by an external risk vendor server with the integration station.

46. The method of claim 45, further comprising communicating by a customer endpoint server with a controller/proxy.

47. The method of claim 35, further comprising providing by the customer configuration data configuration instructions to any of a spec proxy, the workflow engine or the integration station.

48. The method of claim 47, further comprising deploying the customer configuration data in the hub server.

* * * * *